United States Patent
Mayer et al.

(10) Patent No.: US 10,071,670 B2
(45) Date of Patent: Sep. 11, 2018

(54) ENCLOSED HOSE REEL USED FOR SEWER JETTING

(71) Applicant: Federal Signal Corporation, Oak Brook, IL (US)

(72) Inventors: Timothy G. Mayer, Metamora, IL (US); James E. McMullen, Washington, IL (US); Joseph L. Schmidt, Tonica, IL (US)

(73) Assignee: Federal Signal Corporation, Oak Brook, IL (US)

( * ) Notice: Subject to any disclaimer, the term of this patent is extended or adjusted under 35 U.S.C. 154(b) by 183 days.

(21) Appl. No.: 14/994,646

(22) Filed: Jan. 13, 2016

(65) Prior Publication Data

US 2017/0197536 A1    Jul. 13, 2017

(51) Int. Cl.
| | |
|---|---|
| *B60P 3/035* | (2006.01) |
| *B65H 75/42* | (2006.01) |
| *B65H 75/44* | (2006.01) |
| *B60R 19/24* | (2006.01) |
| *B08B 9/04* | (2006.01) |
| *B08B 9/043* | (2006.01) |
| *B60R 19/38* | (2006.01) |
| *E03F 7/10* | (2006.01) |
| *E03F 9/00* | (2006.01) |

(52) U.S. Cl.
CPC .............. *B60P 3/035* (2013.01); *B08B 9/04* (2013.01); *B08B 9/0433* (2013.01); *B60R 19/24* (2013.01); *B60R 19/38* (2013.01); *B65H 75/425* (2013.01); *B65H 75/4463* (2013.01); *B65H 75/4471* (2013.01); *E03F 7/106* (2013.01); *E03F 9/00* (2013.01)

(58) Field of Classification Search
CPC ... E03F 9/00; E03F 9/002; E03F 9/005; E03F 9/007
USPC .......................................................... 293/118
See application file for complete search history.

(56) References Cited

U.S. PATENT DOCUMENTS

| | | | | |
|---|---|---|---|---|
| 3,450,150 | A | * | 6/1969 | Miller .................... B65H 75/38 137/355.16 |
| 3,570,526 | A | | 3/1971 | Fisco, Jr. |
| 3,724,554 | A | * | 4/1973 | Rupert ................. A62C 3/0207 169/24 |
| 3,774,630 | A | * | 11/1973 | Prange ............... B65H 75/4402 137/355.12 |
| 3,910,497 | A | * | 10/1975 | Manor .................. B05B 9/0403 134/168 C |
| 4,199,837 | A | | 4/1980 | Fisco, Jr. |
| 4,207,647 | A | | 6/1980 | Masters |

(Continued)

FOREIGN PATENT DOCUMENTS

| | | | | |
|---|---|---|---|---|
| AU | 2013206422 A1 | * | 1/2014 | |
| FR | 2710273 A1 | * | 3/1995 | ............ A62C 27/00 |
| JP | 2010126332 A | * | 6/2010 | |

*Primary Examiner* — Hilary L Gutman
(74) *Attorney, Agent, or Firm* — Merchant & Gould P.C.

(57) ABSTRACT

A hose reel arrangement for sewer jetting includes a reel; a hose wound around the reel; a reel frame holding the reel; and a cover arrangement. The reel frame with the reel is rotatable about a frame axis perpendicular to a horizontal mounting surface. The cover arrangement is over a majority of the reel and reel frame. The cover arrangement is selectively movable to expose a portion of the reel to provide access to the hose. The cover arrangement is fixed in position relative to the rotatable reel frame and reel.

22 Claims, 21 Drawing Sheets

(56) References Cited

U.S. PATENT DOCUMENTS

| | | | |
|---|---|---|---|
| 4,234,980 A | 11/1980 | DiVito et al. | |
| 4,896,686 A * | 1/1990 | Schmidt, Jr. | B08B 9/043 |
| | | | 134/167 C |
| 4,935,984 A | 6/1990 | Bryant et al. | |
| RE34,585 E * | 4/1994 | Schmidt, Jr. | B08B 9/043 |
| | | | 134/167 C |
| 5,535,775 A | 7/1996 | Blaine | |
| 5,636,648 A | 6/1997 | O'Brien et al. | |
| 6,789,564 B1 * | 9/2004 | Wu | B65H 75/38 |
| | | | 137/315.01 |
| 7,452,015 B1 * | 11/2008 | Stock, Jr. | B60R 25/00 |
| | | | 180/271 |
| 2003/0182754 A1 | 10/2003 | O'Brien | |
| 2004/0089734 A1 | 5/2004 | Martin | |
| 2005/0110284 A1 * | 5/2005 | Browne | B60R 19/40 |
| | | | 293/118 |
| 2011/0172882 A1 * | 7/2011 | Schrader | B60R 19/40 |
| | | | 701/41 |
| 2013/0042894 A1 * | 2/2013 | Gromes, Sr. | F28G 15/02 |
| | | | 134/22.12 |

* cited by examiner

ENCLOSED HOSE REEL USED FOR SEWER JETTING

TECHNICAL FIELD

This disclosure relates to an apparatus for cleaning sewer lines, pipelines, and closed chambers and/or conduits in which water is jetted into the conduits at high pressure. In particular, this disclosure is related to such an apparatus for keeping the water-handling components of the apparatus in an unfrozen state during freezing conditions.

BACKGROUND

It is known to provide mobile sewer cleaning units having a reservoir of a large supply of water and water-handling components including a hose reel and a hose normally coiled thereon, and a high pressure pump suitably connected between the reservoir and the hose to deliver water to the hose at high pressure.

One problem associated with this equipment is that the water-handling components freeze during freezing conditions of the weather if the water is left in any of the components during freezing conditions, even when the equipment is in operation. If the pump or valves freeze, the problem could lead to cracking these components.

While there have been efforts to address this problem by enclosing the hose reel within a shroud, such efforts in the past have been limited in that there is an impaired ability to align the hose reel to the manhole for accessing the sewer. There have also been efforts to address this problem by placing the rotating hose reel in an enclosure that covers the reel only during transport mode. In these types of systems, the hose reel must be telescoped outside the enclosure to rotate and work. Although this type of design improves the flexibility to align the hose reel to the manhole, it also exposes the hose reel to the outside elements which limits the working time in freezing temperatures.

Improvements are desirable.

SUMMARY

To address these problems and improve over the prior art, a hose reel arrangement for sewer jetting is provided. The hose reel arrangement includes a reel; a hose wound around the reel; a reel frame holding the reel, the reel frame with the reel being rotatable about a frame axis perpendicular to a horizontal mounting surface; and a cover arrangement over a majority of the reel and reel frame. The cover arrangement is selectively moveable to expose a portion of the reel to provide access to the hose. The cover arrangement is fixed in position relative to the rotatable reel frame and reel.

The cover arrangement can include many embodiments. In one example, the cover arrangement includes an upper cover covering a top of the reel and frame, a bottom cover covering a bottom of the reel and frame, and a shroud extending between the upper cover and bottom cover.

The shroud may include a movable door, which can include a plurality of doors, to expose the portion of the reel.

The cover arrangement may cover at least 90% of the reel and reel frame.

The cover arrangement may cover 100% of the reel and reel frame.

The reel frame and reel are rotatable at least 120°.

The reel frame and reel may be rotatable at least 180°.

The reel may be rotatable on a reel axis perpendicular to the frame axis.

The arrangement may further include a chassis and a bearing secured to the chassis. The reel frame is mounted on the bearing so as to be rotatable relative to the chassis.

In some arrangements, a bumper is attached to the chassis and is adjacent to the reel frame.

The bumper may be selectively movable from an extended operating position to a collapsed position.

In one or more embodiments, the shroud is substantially cylindrical in cross-section.

In some embodiments, the shroud is obround in cross-section.

In some embodiments, the shroud is polygonal in cross-section.

In some embodiments, the shroud has one or more faceted sides.

It should be understood that any feature characterized above can be used alone or in combination with any other feature or subcombination to achieve advantages.

In accordance with principles of this disclosure, a truck is provided including hose reel arrangement as characterized in any combination above and further comprising a cab, in which the hose reel arrangement is mounted at a rear of the truck behind the cab.

In accordance with principles of this disclosure, a truck is provided including a hose reel arrangement of any of the various combinations as characterized above including a cab and wherein the hose reel arrangement is mounted at a front of the truck in front of the cab. It should be understood that any feature characterized herein and above can be used alone or in combination with any other feature or subcombination to achieve advantages.

In accordance with principles of this disclosure, a truck is provided including a hose reel arrangement as variously characterized above in any combination and further including a cab, wherein the hose reel arrangement is mounted along the side of the truck, behind the cab and forward of the rear end of the truck.

In another aspect, a bumper for a truck is provided. The bumper includes a bumper bracket and a mounting arrangement securing the bumper bracket to a truck chassis. The mounting arrangement is constructed and arranged to allow the bumper bracket to be selectively movable from a working position locked in extension from the chassis, to a collapsed position nearer the chassis than when in the working position.

The mounting arrangement for the bumper may include a pair of extension mounting brackets connected to the bumper bracket.

The mounting arrangement can include a horizontal mounting bracket, wherein the pair of extension mounting brackets are secured to and between the horizontal mounting bracket and the bumper bracket.

The bumper may include a pin arrangement between the extension mounting brackets and the bumper bracket that is selectively movable such that: (i) when the pin arrangement is operably mounted in the extension mounting brackets and bumper bracket, the bumper bracket is fixed relative to the extension mounting brackets and the horizontal mounting bracket in the working position extended from the chassis; and (ii) when the pin arrangement is removed from the extension mounting brackets and bumper bracket, the bumper bracket is moveable relative to the extension mounting brackets and the horizontal mounting bracket in the collapsed position adjacent to the chassis.

In one or more embodiments, the mounting arrangement comprises a pair of side mounting brackets connected to and extending between the chassis and the horizontal mounting bracket.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the forgoing general description and the following detailed description are explanatory only and are not restrictive of the invention claimed. Each of the features characterized above can be used in combination with any feature alone or in combination shown in the drawings below.

DETAILED DESCRIPTION

Figure 1:
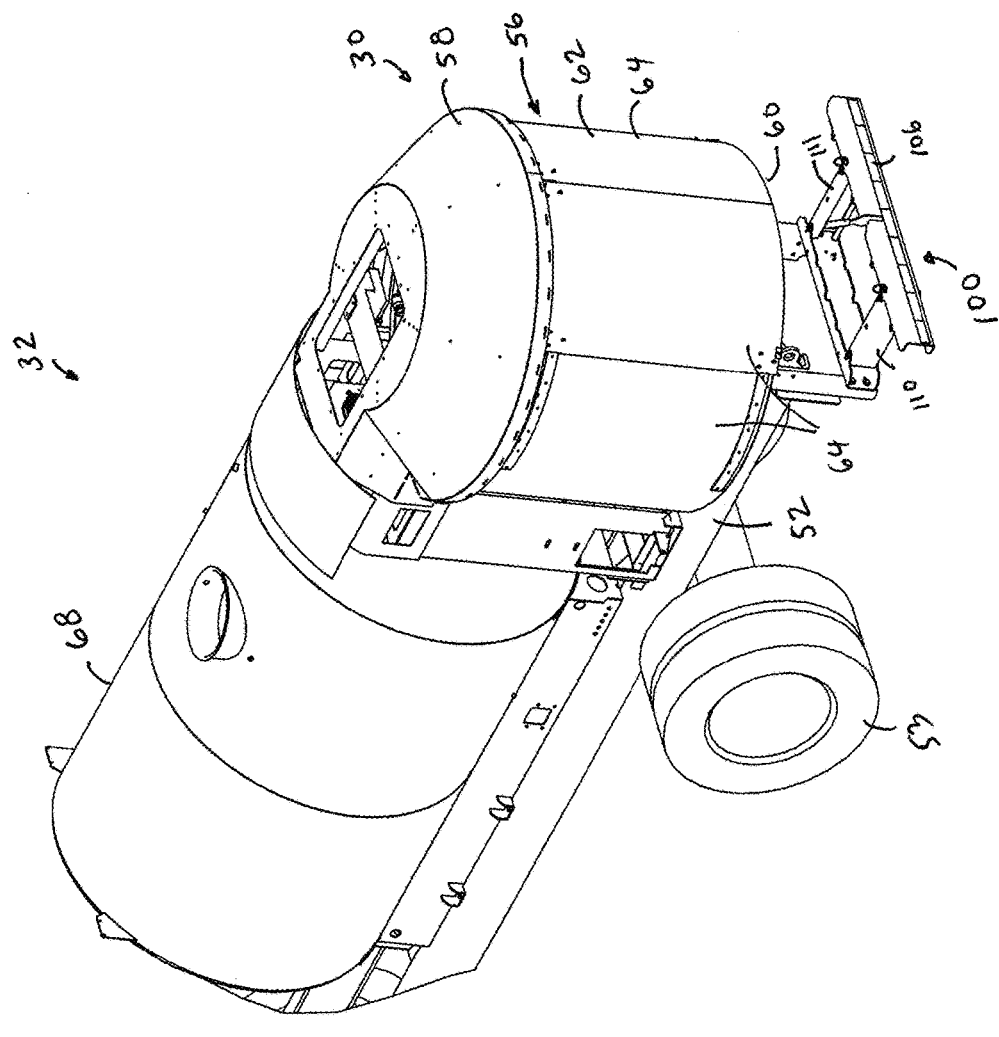
FIG. 1 is a left perspective view of an embodiment of a hose reel arrangement shown at the rear of a truck and with the doors closed enclosing the hose reel arrangement, constructed in accordance with principles of this disclosure.

This disclosure includes a reel holding a hose located inside of an enclosure. The enclosure can be generally cylindrical or similar shapes. The reel and enclosure rotate on the same vertical axis. There would be an access opening, such as an opening exposed by a door including a sliding door, that allow the hose to unwind from the reel into the intended target, such as a manhole for a sewer. In some arrangements, there can be an additional top that covers the enclosure to protect the reel from the environment. In some embodiments, heat may be directed inside of the enclosure to prevent water from freezing. The rotating reel and enclosure protects the reel from the environment and at the same time, allows the operator to align the reel to the intended target (e.g., manhole) regardless of where the manhole is located in the street.

This disclosure simplifies the plumbing of water and hydraulic hoses as well as the electrical cabling to the hose reel as compared to other designs. The hose reel arrangement may be mounted on a truck chassis, or it could be adapted to a trailer jetter. In addition, the arrangement may include accessory items such as nozzles, hand tools, and hand gun reels mounted in the enclosure to be easily accessible through the access opening, exposed by sliding doors (as one example). The hose reel arrangement of this disclosure requires much less room at the rear to access the manhole since it does not need to telescope away from the enclosure.

FIGS. 1-16 illustrate a hose reel arrangement 30 according to one embodiment. The hose reel arrangement 30 can be used for sewer jetting. For example, a mobile sewer cleaning unit 32 may be driven to an access point for a sewer. The access point typically is a manhole. A hose from the hose reel arrangement 30 is put into the opening of the manhole, and water is directed at a high pressure through the hose to clean the sewer. The water is typically pumped from a reservoir that is also included as part of the mobile sewer cleaning unit 32.

In accordance with principles of this disclosure, the hose reel arrangement 30 includes a reel 34 (FIGS. 4, and 10-16). The reel 34 may include an elongated cylindrical winding member 36 which defines the hose winding surface. The winding member 36 will typically be a cylinder having a circular cross-section. Radially extending end plates 38 are on opposite ends of the winding member 36 and provide a way for retaining the hose on the winding member 36.

Figure 4:
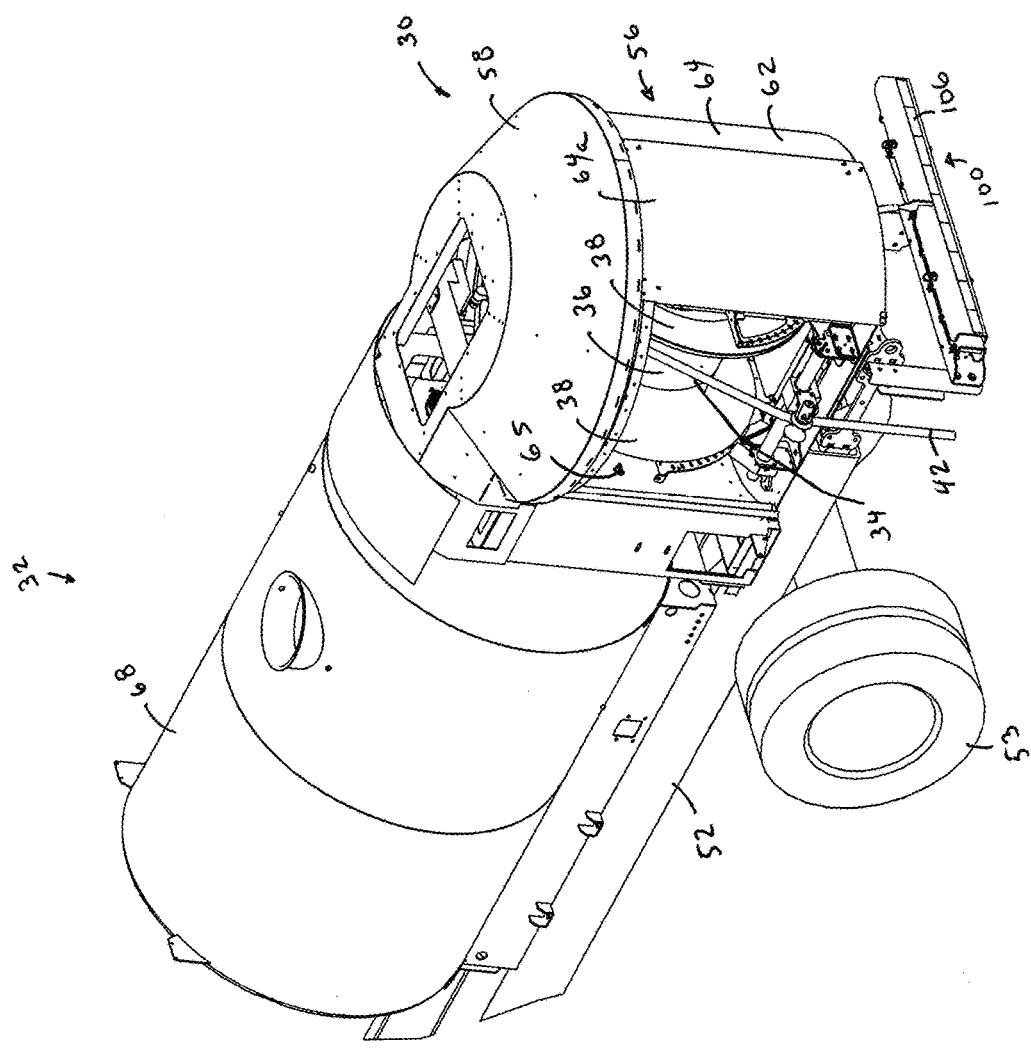
FIG. 4 is a left perspective view of the hose reel arrangement of FIG. 1 and showing the doors opened to reveal the reel and hose.
Figure 13:
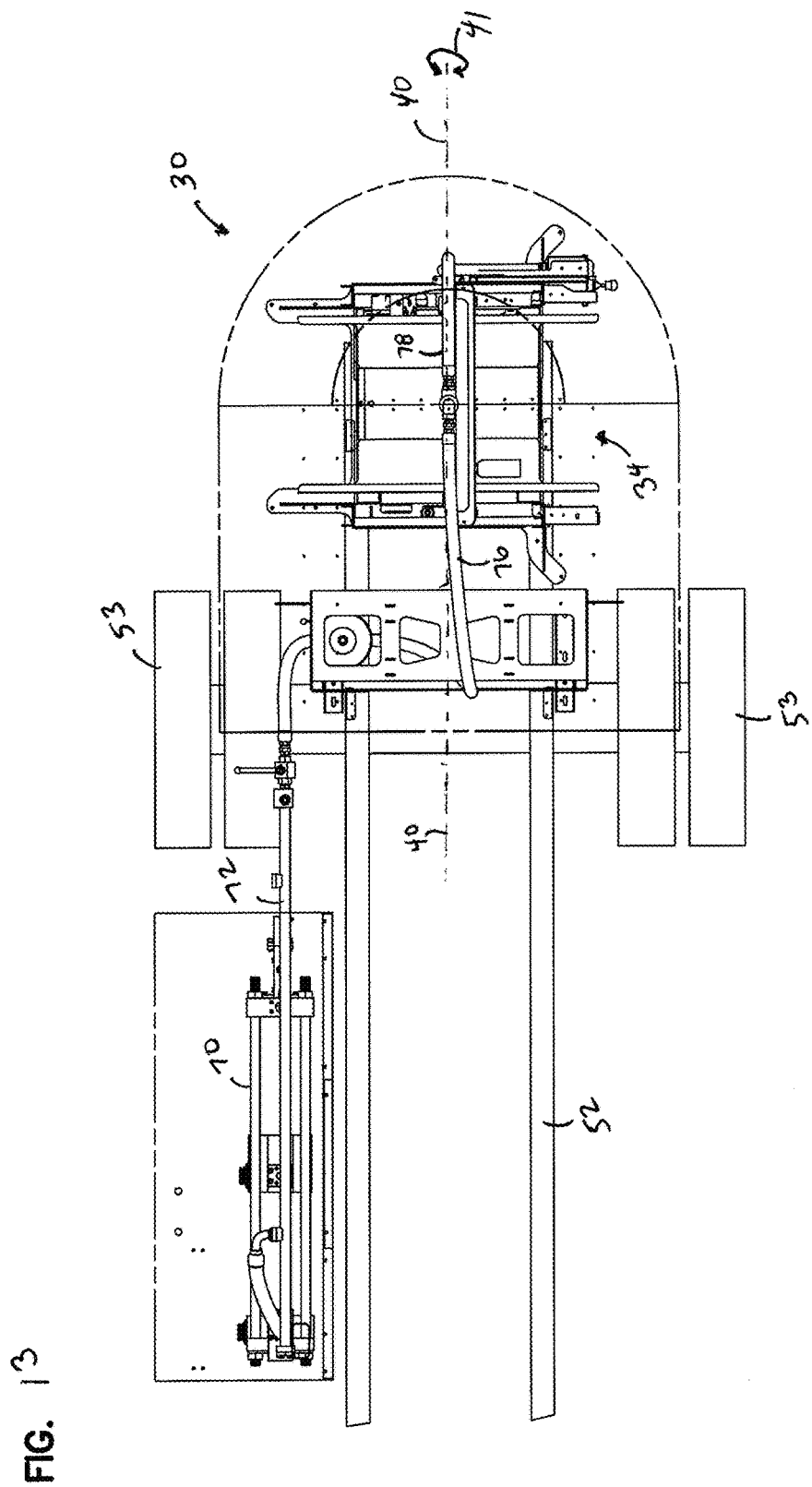
FIG. 13 is a top view of the embodiment of FIGS. 10-12.
Figure 14:
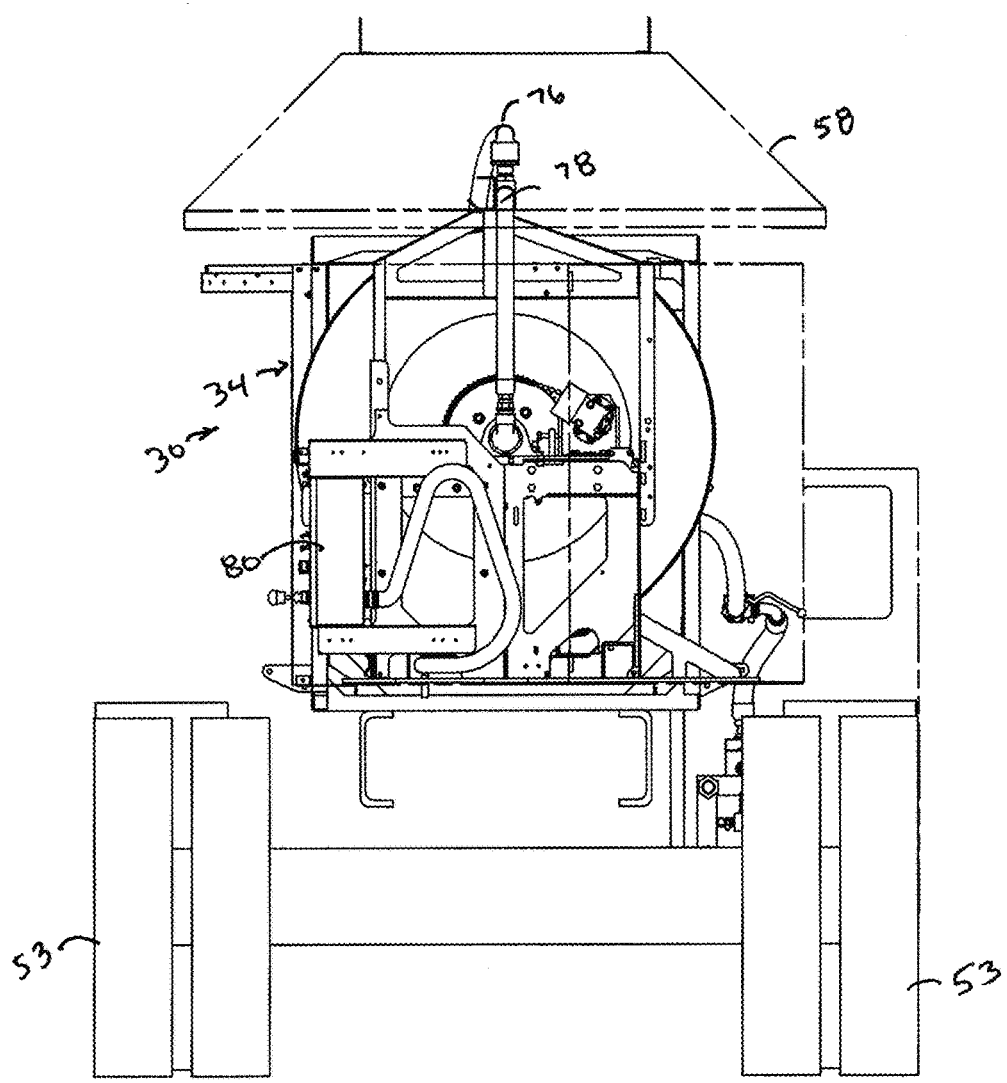
FIG. 14 is an end view of the embodiment of FIG. 10.
Figure 15:
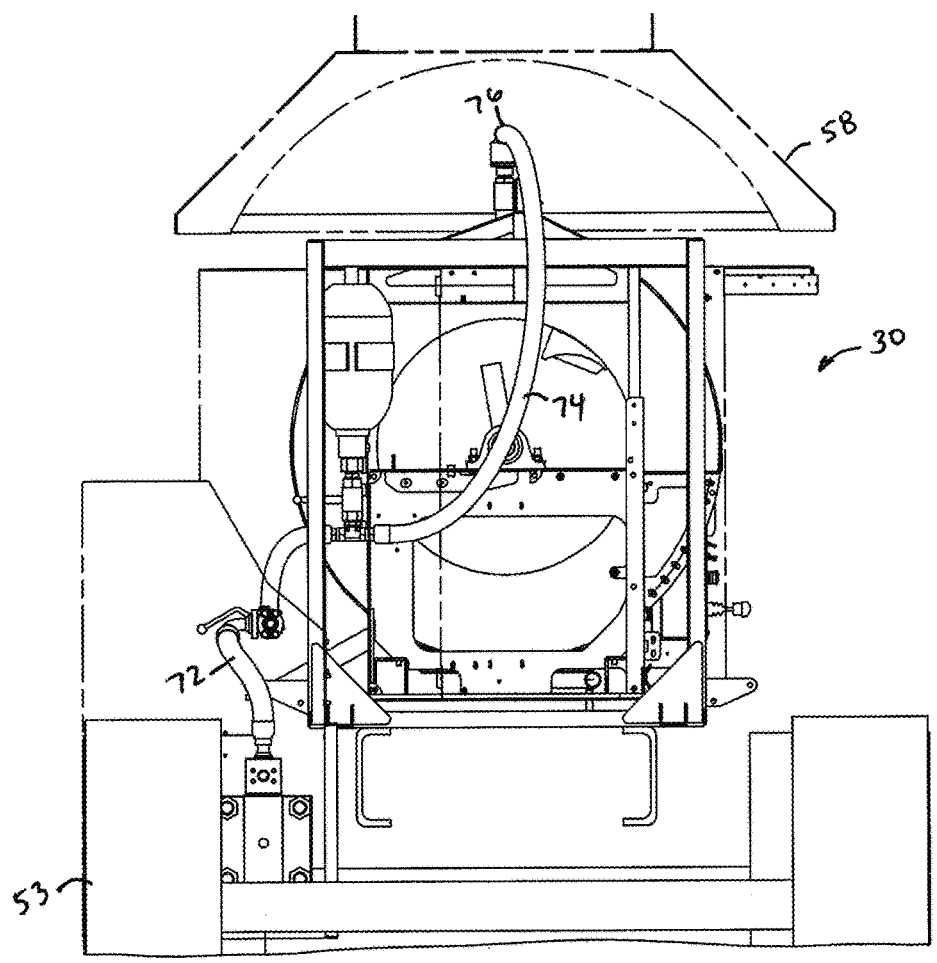
FIG. 15 is an opposite end view of the embodiment of FIG. 10.

Extending longitudinally through a center of the winding member 36 and end plates 38 is a reel winding axis 40 (FIG. 13). The reel 34 winds about the reel winding axis 40 in the direction of arrow 41 to coil and uncoil a hose 42. The hose 42 will normally be wound or coiled around the winding member 36 of the reel 34 (FIG. 4).

The hose reel arrangement 32 includes a reel frame 44. The reel frame 44 holds the reel 34. The reel frame 44 with the reel 34 are rotatable about frame axis perpendicular relative to a horizontal mounting surface. The frame axis 46 and the reel winding axis 40 are perpendicular to each other. The reel winding axis 40 will generally be parallel to a horizontal mounting surface, while the frame axis 46 will be perpendicular to the horizontal mounting surface. In many instances, the horizontal mounting surface is the ground surface upon which the hose reel arrangement 32 is resting upon.

In FIGS. 10-15, the reel frame 44 can be seen. The reel frame 44 includes vertical frame members 48 that are generally adjacent to the end plates 38 of the reel 34. The reel 34 is secured in a rotatable manner with respect to the reel frame 44 by an appropriate arrangement with the vertical frame members 48.

Figure 11:
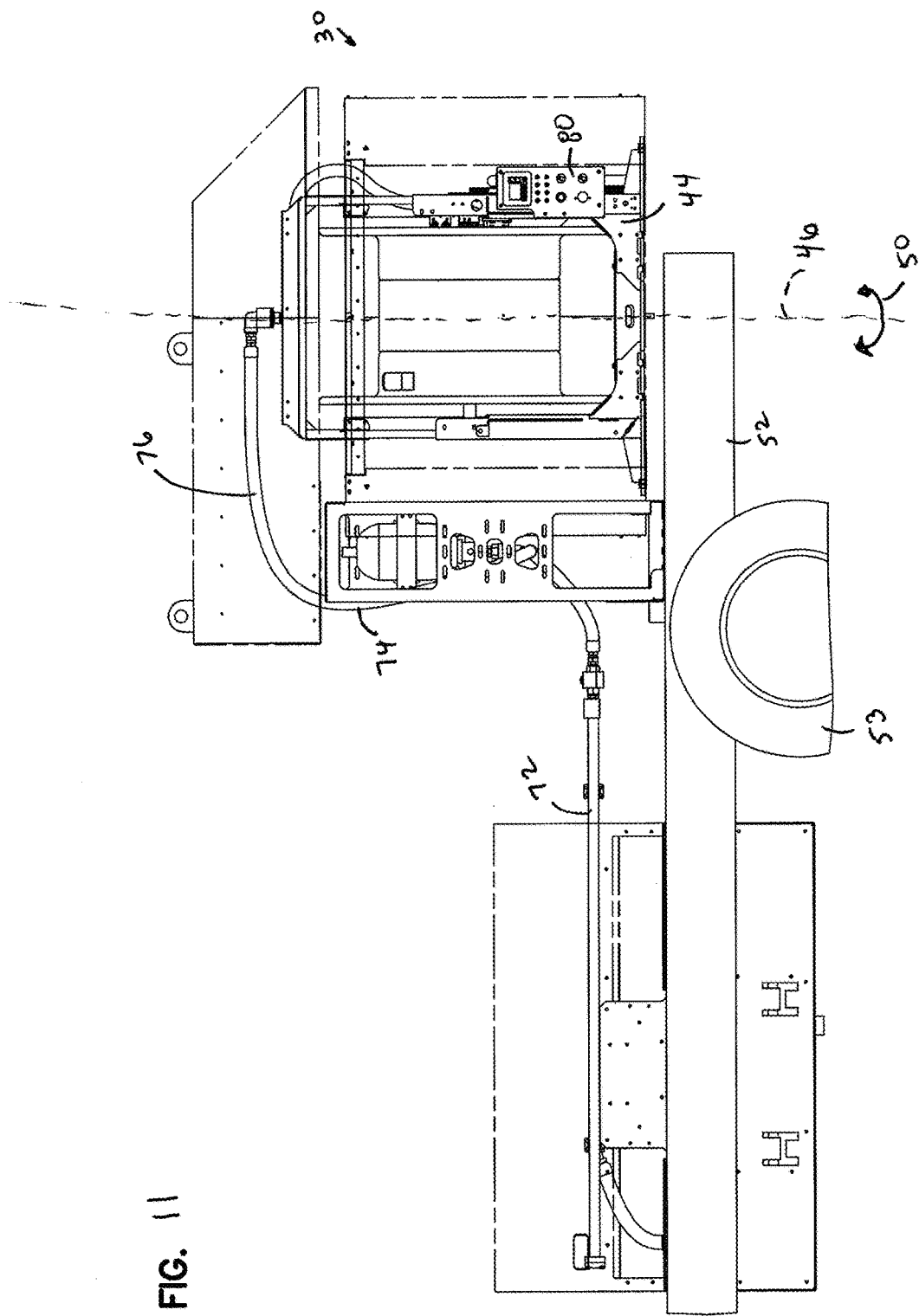
FIG. 11 is a side view of the embodiment of FIG. 10.
Figure 12:
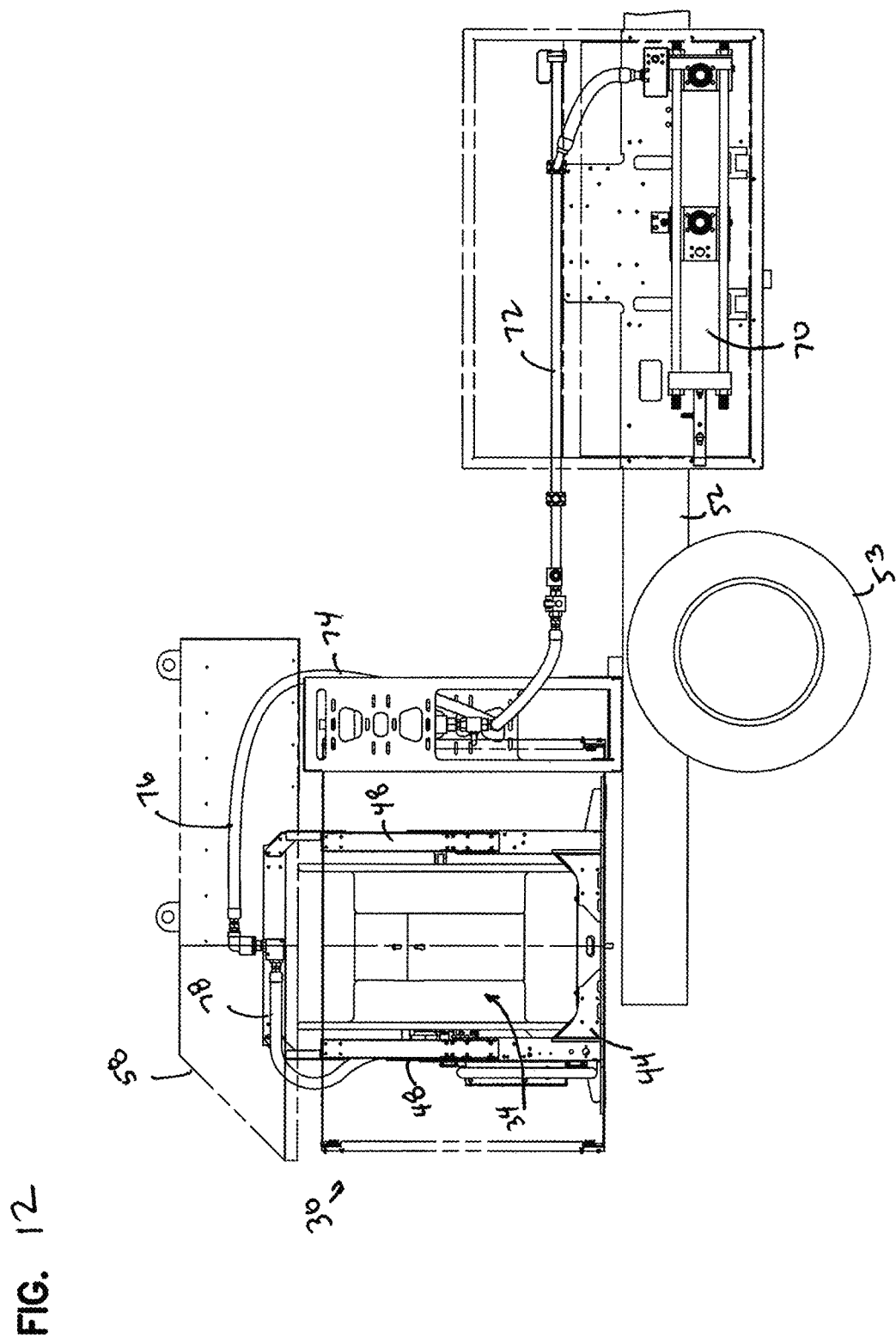
FIG. 12 is an opposite side view of the embodiment of FIG. 11.

In general, the reel frame 44 and reel 34 are rotatable about the frame axis 46 through a range of at least 90°, in many instances at least 120°, and preferably at least 180°. In many instances, the reel frame 44 and reel 34 are rotatable through a range less than 270°. FIG. 11 shows an arrow 50 of rotation about frame axis 46.

Figure 10:
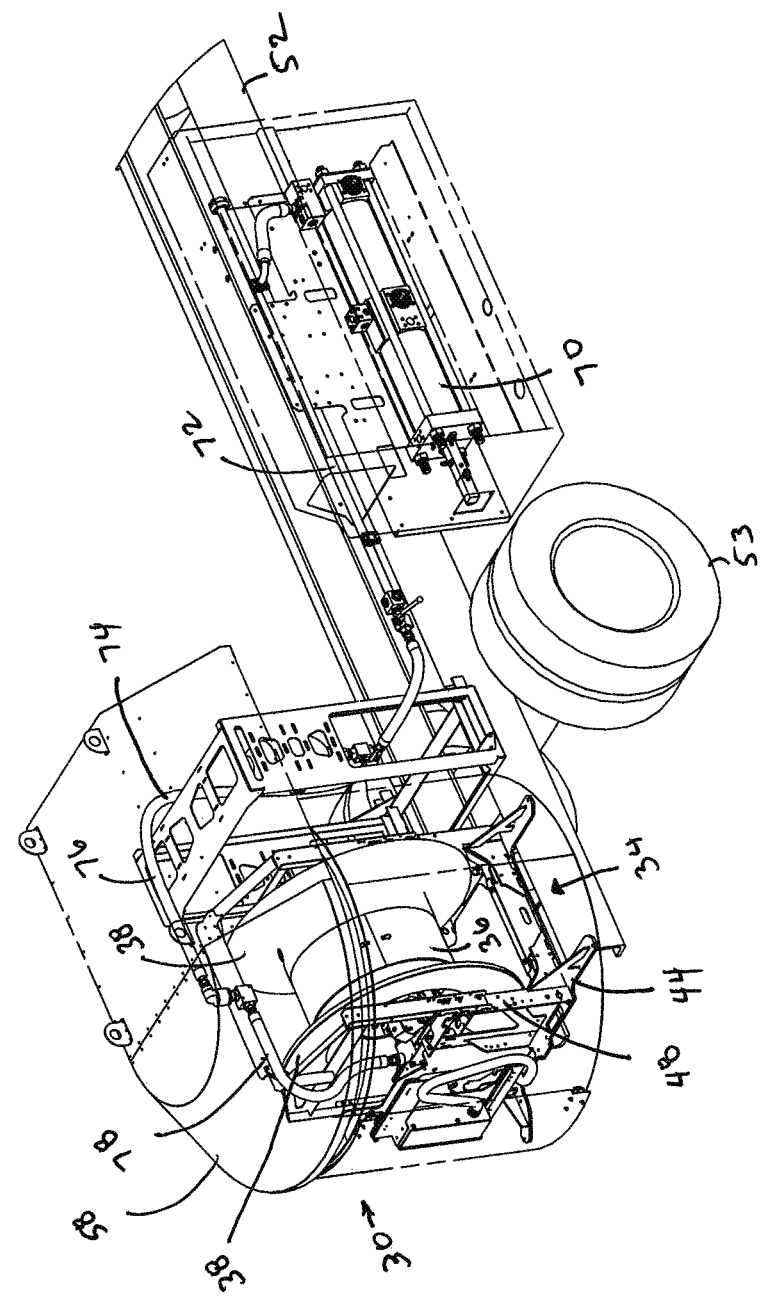
FIG. 10 is a schematic, perspective view of the hose reel arrangement, constructed in accordance with principles of this disclosure.
Figure 20:
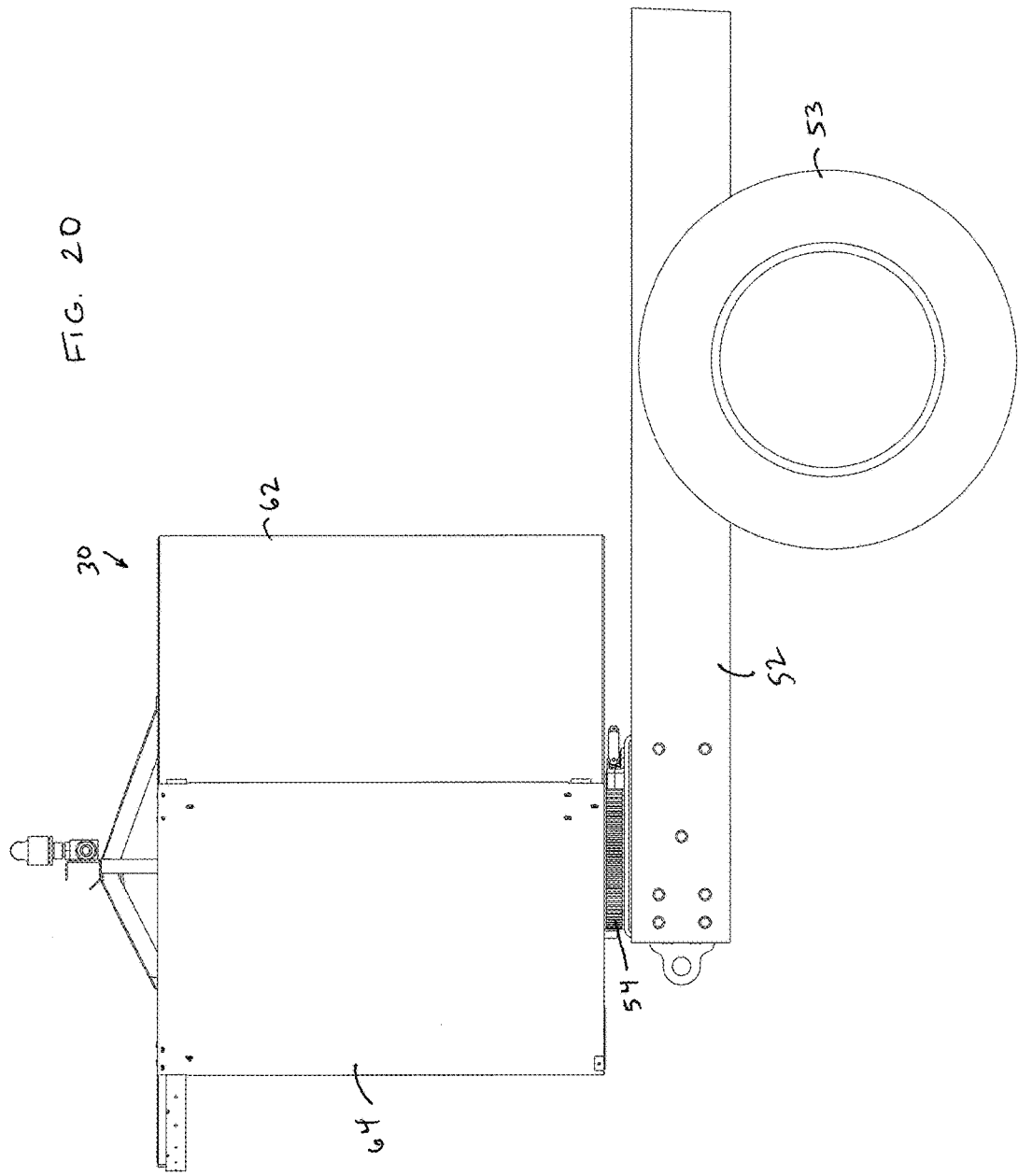
FIG. 20 is a side view of a section of the arrangement of FIG. 1, depicting the bearing between the frame and the chassis.
Figure 21:
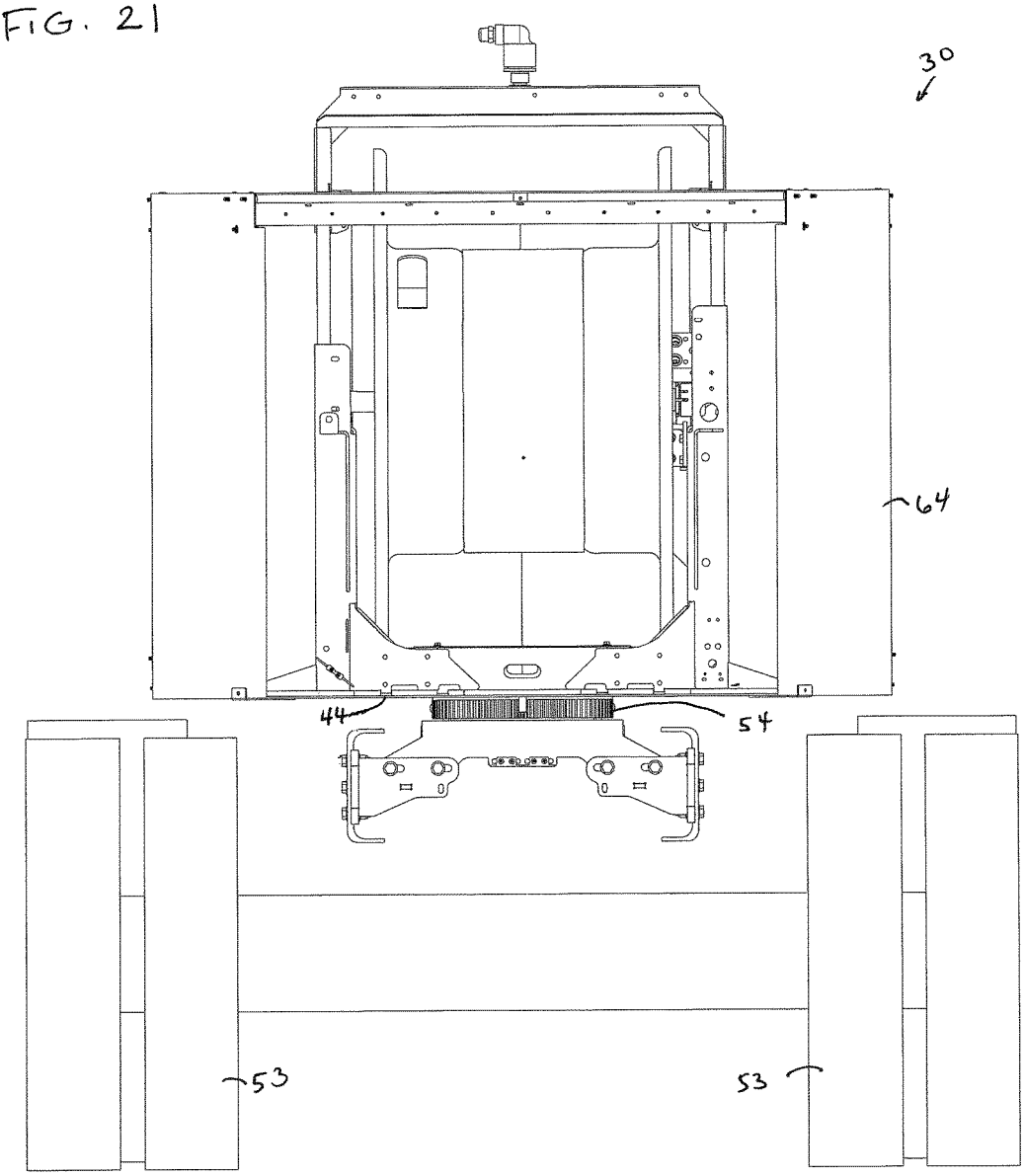
FIG. 21 is a front view of FIG. 20.

In FIG. 10, the hose reel arrangement 30 is shown mounted on a chassis 52. The chassis 52 can be the framework of a vehicle such as the mobile sewer cleaning unit 32. A rotating device can be secured to the chassis 52 to allow the reel frame 44 to rotate relative to the chassis 52. Many different types of rotating devices are useable. In the particular embodiment illustrated, a bearing 54 (FIGS. 20 and 21) is secured to the chassis 52. The reel frame 44 is mounted on the bearing 54 so as to be rotatable relative to the chassis 52. The bearing 64 is depicted as a slewing bearing. Other embodiments are possible. A plurality of wheels 53 are visible connected to the chassis 52 to allow for transporting the unit 32.

In accordance with principles of this disclosure, the hose reel arrangement 30 includes a cover arrangement 56. The cover arrangement is over a majority (that is greater than 50%) of the reel 34 and reel frame 44. The cover arrangement 56 is selectively movable to expose at least a portion of the reel 34 to provide access to the hose 42. The cover arrangement 56 is fixed in position relative to the rotatable reel frame 44 and reel 34.

In many preferred embodiments, the cover arrangement includes an upper cover 58 covering a top or upper portion of the reel 34 and reel frame 44.

In preferred embodiments, the cover arrangement 56 includes a bottom cover 60 covering a bottom of the reel 34 and reel frame 44.

In preferred arrangements, the cover arrangement 56 includes a shroud 62. The shroud 62 preferably extends between the upper cover 58 and bottom cover 60. The shroud 62 preferably extends a full length between the upper cover 58 and bottom cover 60.

In the example embodiments shown, the shroud 62 includes an access opening that can be exposed by a variety of structures. The structures can be solid (e.g. removable covers) or flexible (e.g., curtains, etc.). In the particular embodiment depicted, there is at least one movable door 64 to expose the portion of the reel 34. In the embodiment shown of FIGS. 1-9, there are a plurality of doors 64 that are slidable in order to selectively expose or cover the reel 34. In this embodiment, the shroud 62 is generally cylindrical in shape, so a top and bottom rim of the doors 64 are on a radius that match the radius of the upper cover 58 and bottom cover 60. Again, many embodiments are possible, and the doors 64 depicted are convenient.

In preferred arrangements, the cover arrangement 56 covers at least 90% of the reel 34 and reel frame 44. In many preferred arrangements, the cover arrangement 56 covers 100% of the reel 34 and reel frame 44.

Figure 2:
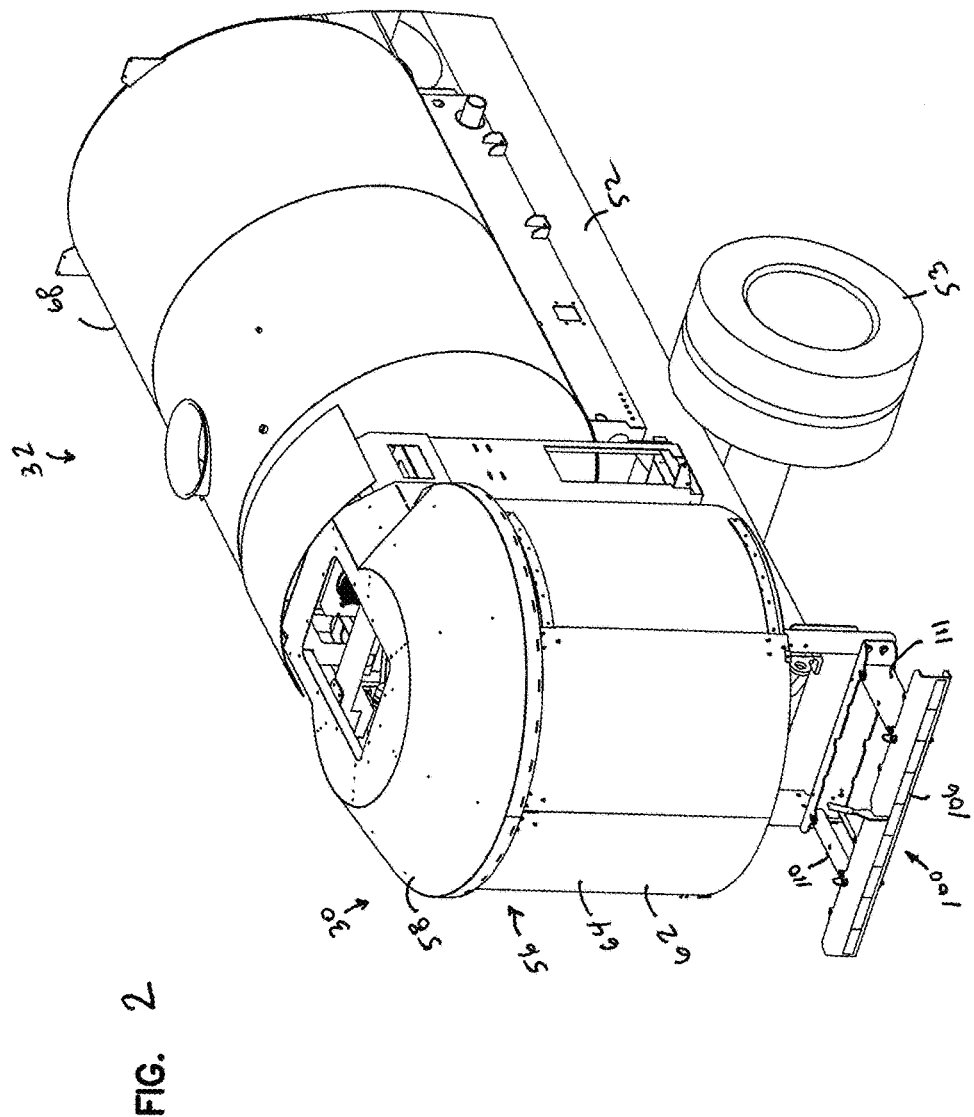
FIG. 2 is a right perspective view of the arrangement of FIG. 1.
Figure 3:
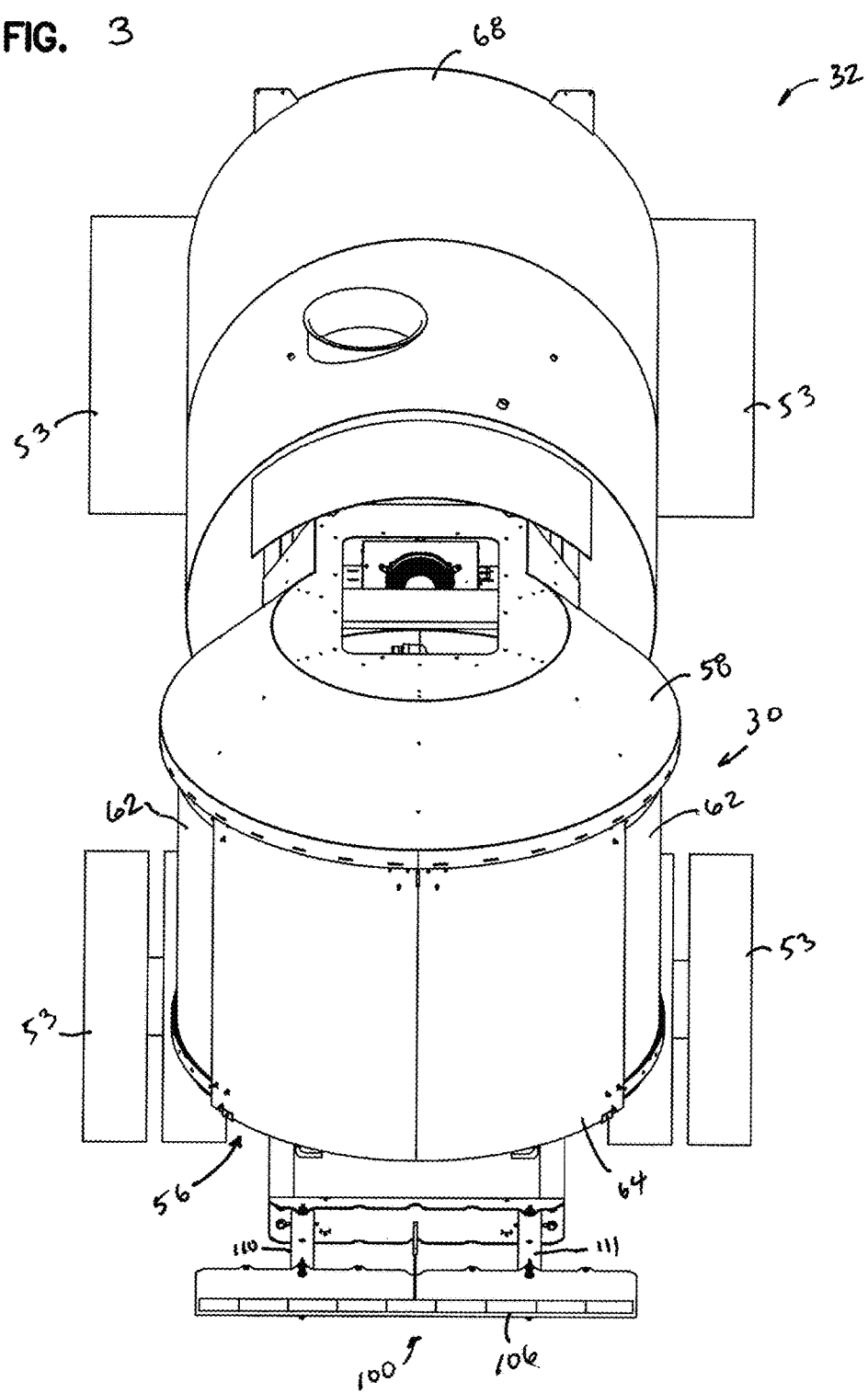
FIG. 3 is a center perspective view of the arrangement of FIG. 1.
Figure 5:
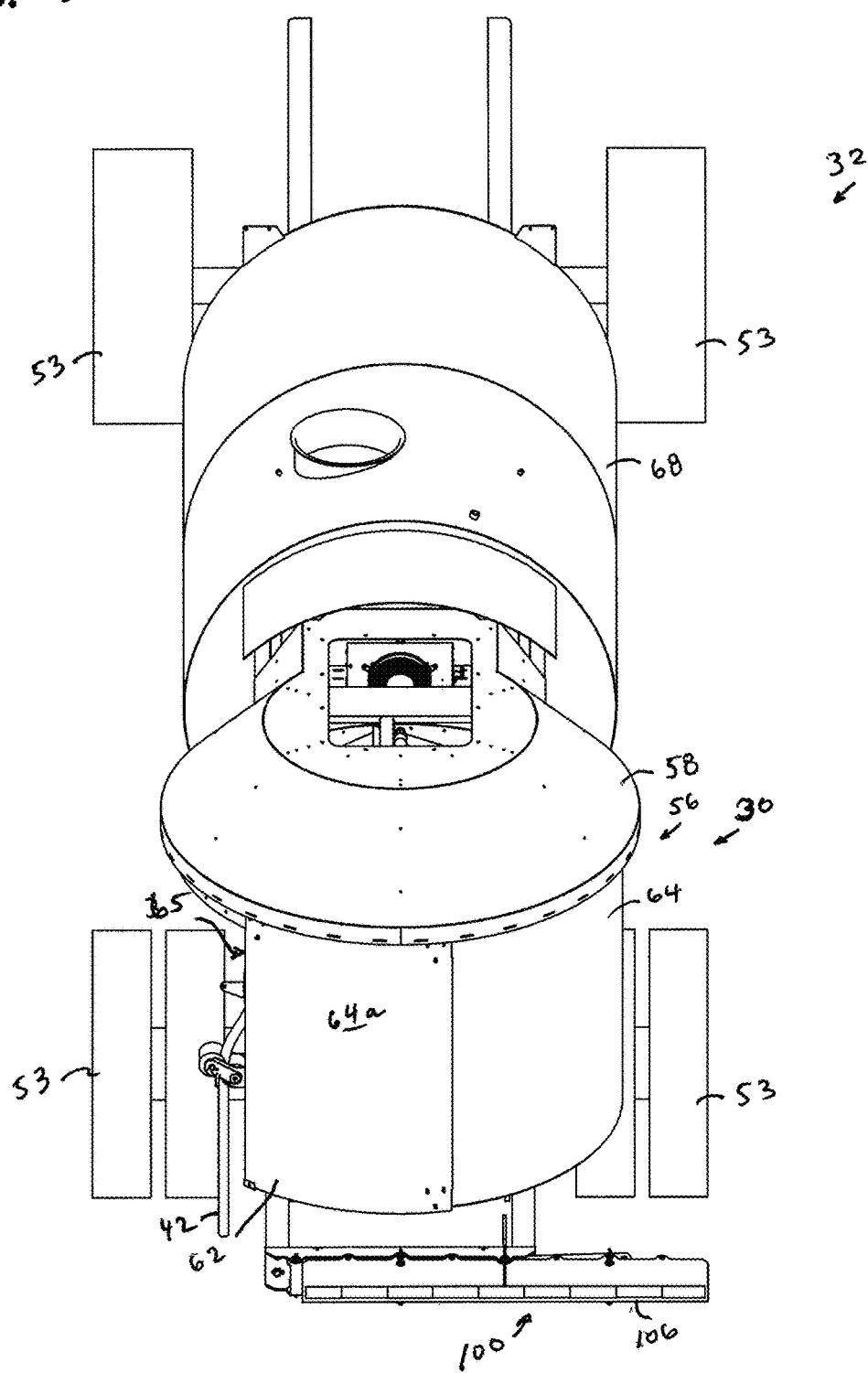
FIG. 5 is a center perspective view of the embodiment of FIG. 4.
Figure 6:
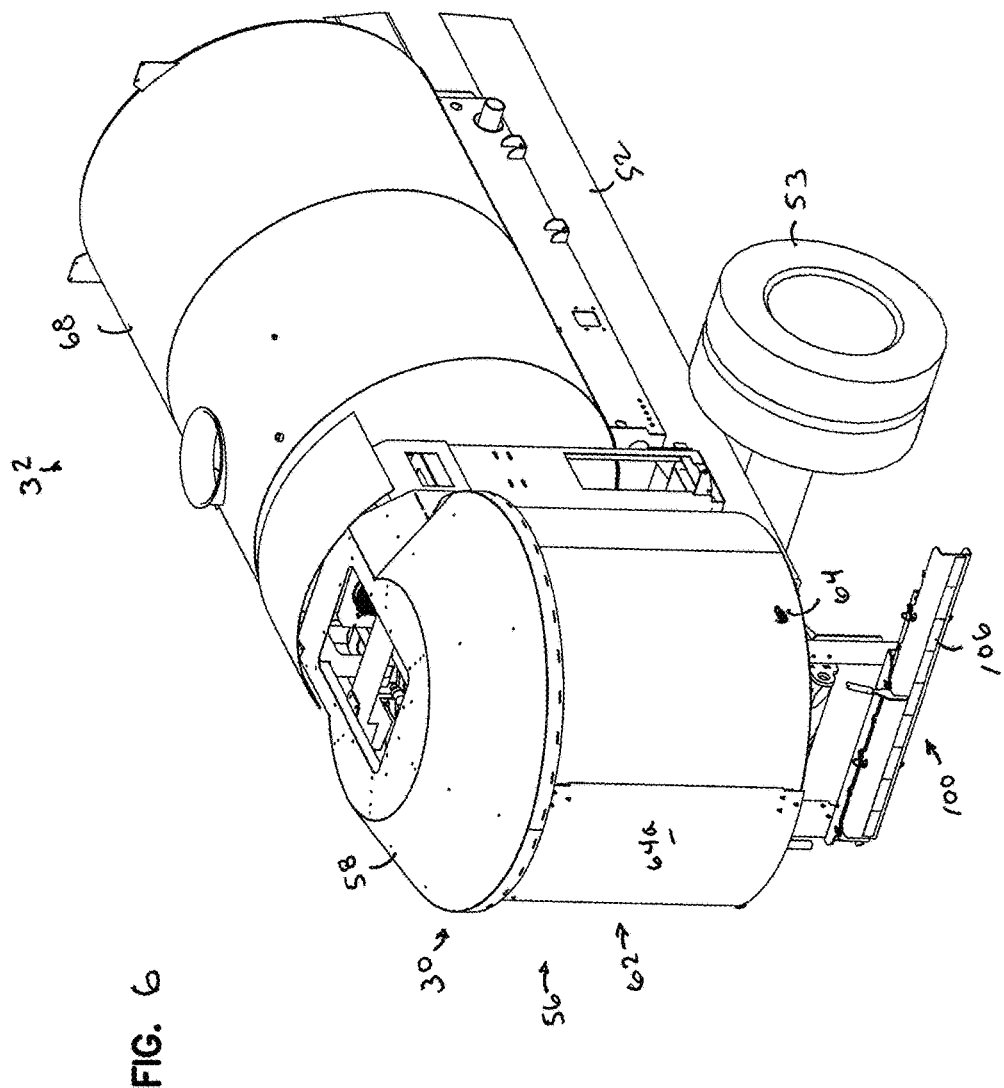
FIG. 6 is a right perspective view of the embodiment of FIG. 4.

FIGS. 1-3 show the shroud 62 with all of the doors 64 closed to completely cover the reel 34 and reel frame 44. FIGS. 4-6 show door 64a moved to create an access opening 65 and expose a portion of the reel 34. The hose 42 can be seen extending out of the cover arrangement 56 and downwardly in a direction toward what would be a manhole opening.

Figure 7:
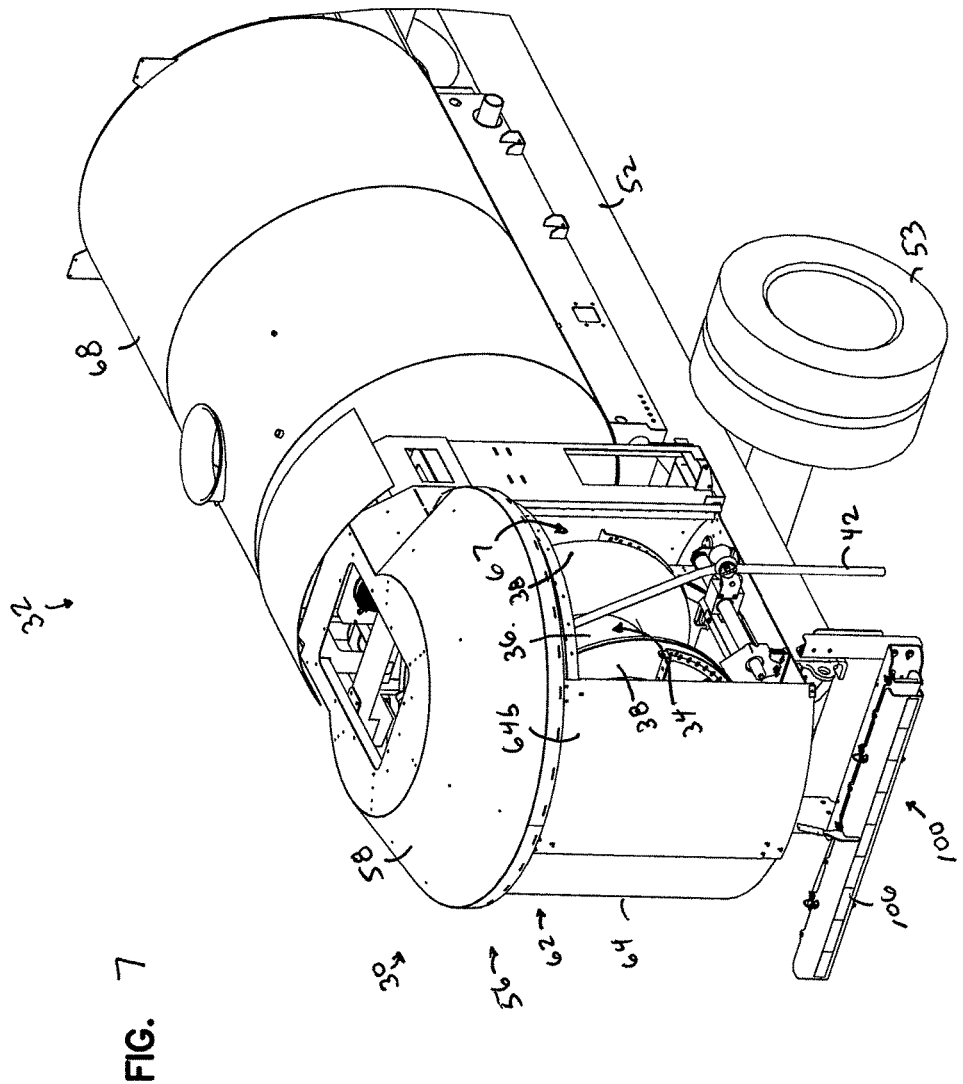
FIG. 7 is a right perspective view of the hose reel arrangement and showing the doors opened.
Figure 8:
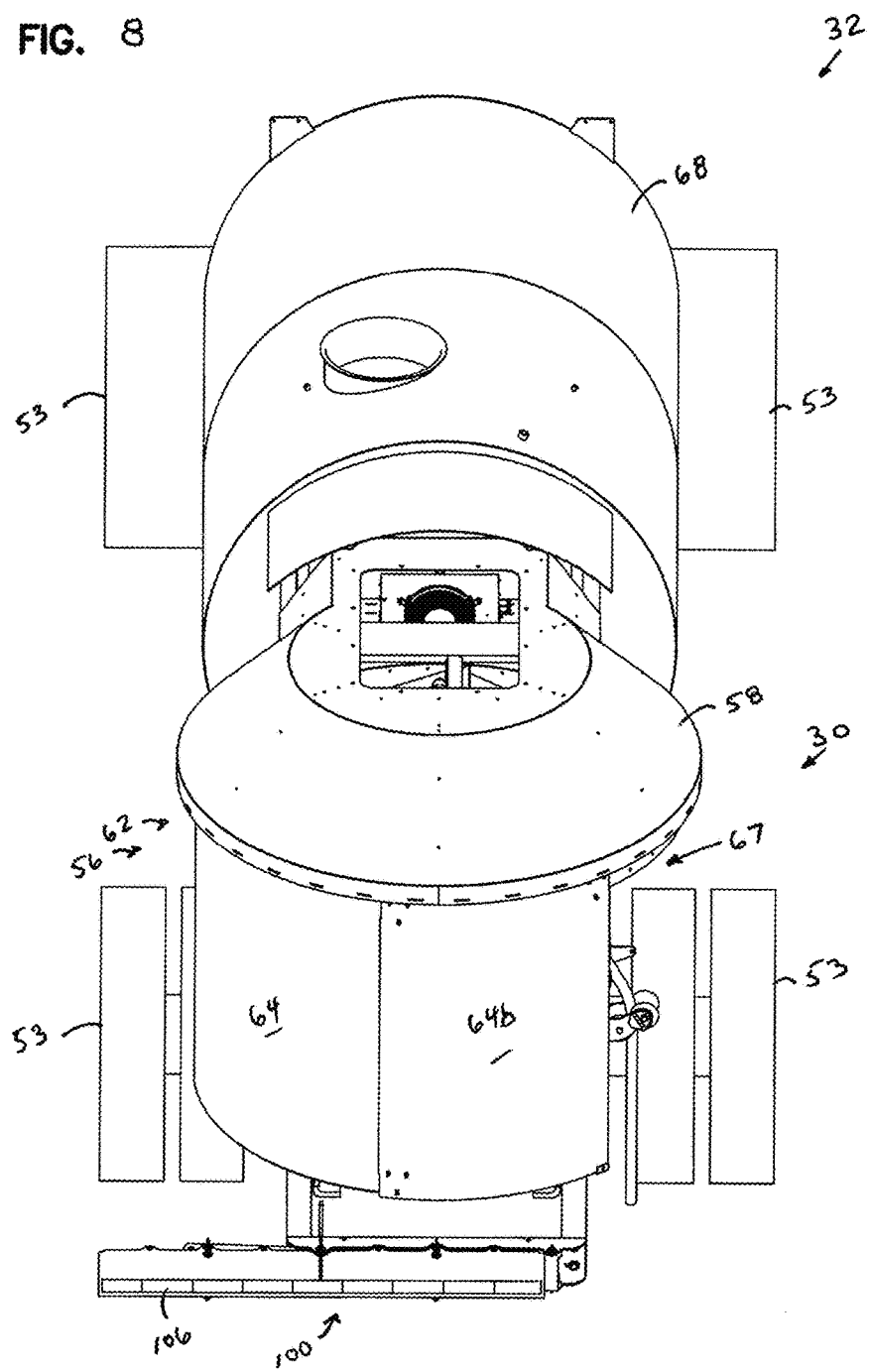
FIG. 8 is a center perspective view of the arrangement of FIG. 7.
Figure 9:
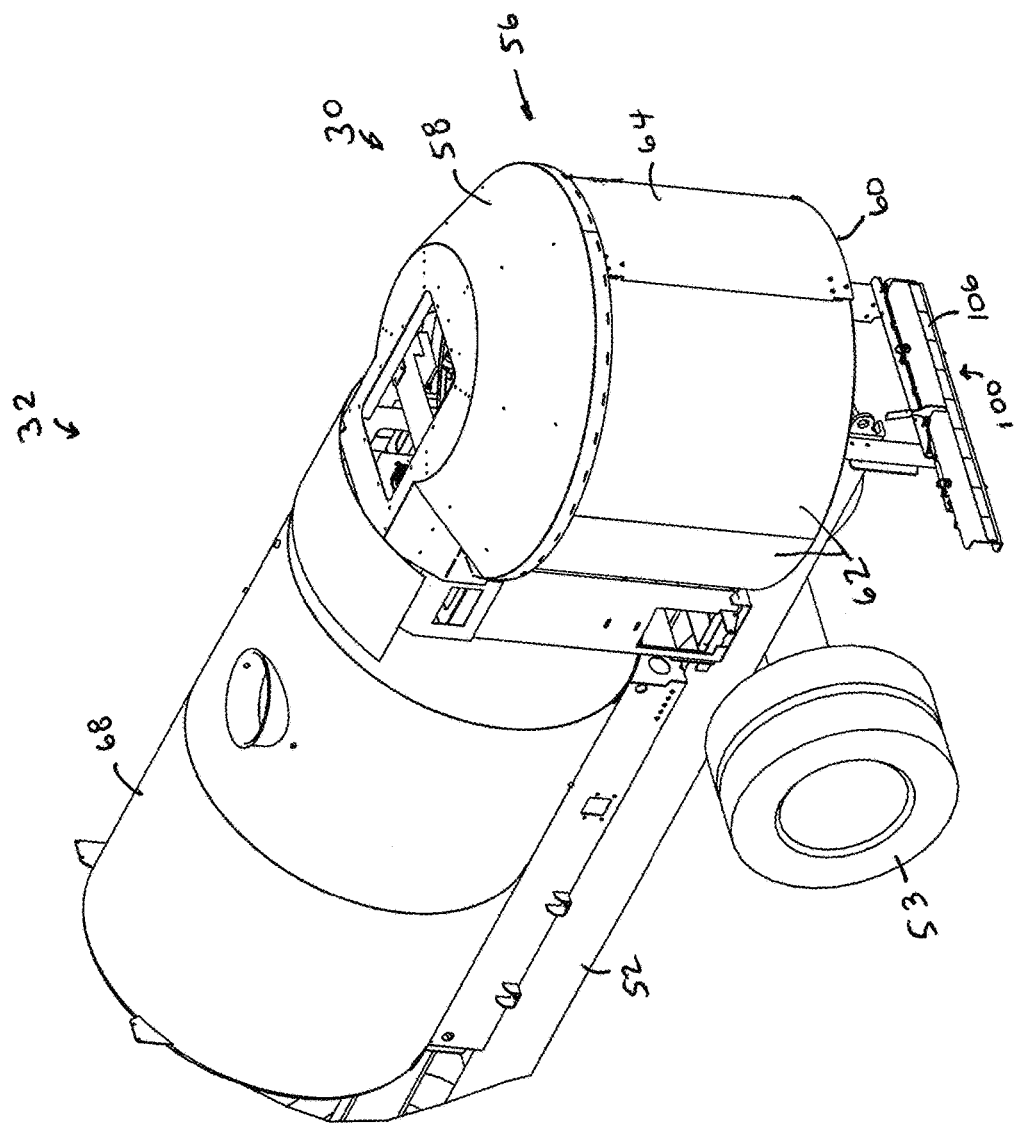
FIG. 9 is a left perspective view of the embodiment of FIG. 7.

FIGS. 7-9 show a door 64b moved to expose an opening 67 in the shroud 62, with the hose 42 being seen extending out of the shroud 62 in a downward direction toward what would be a manhole opening.

The movement of the doors 64a, 64b can be implemented in a variety of ways. In preferred embodiments, the doors 64a, 64b are slidable within a slide frame in one or both of the upper cover 58 or bottom cover 60 or in the shroud 62.

In the embodiment shown, the shroud 62 is generally round forming the shape of a cylinder. This shape contributes to being able to align the reel to the manhole, regardless of where the manhole is located on the street. In other embodiments, the shroud 62 can be other shapes such as obround, polygonal, square or a rectangle with rounded corners, or have one or more faceted sides.

FIGS. 10-15 illustrate the basic plumbing layout for the mobile sewer cleaning unit 32. Not illustrated in FIGS. 10-15 is a water reservoir or tank 68, shown in FIGS. 1-9. The tank 68 is omitted from FIGS. 10-15 in order to illustrate other components. A pump 70 is located adjacent to the tank 68 and is for pumping water from the tank 68 to the hose reel arrangement 30. A conveyance hose 72 leads from the pump 70 to the hose reel arrangement. The conveyance hose 72 can be seen running from the pump 70 and generally parallel to the chassis 52 before turning vertically upwardly at hose section 74. Hose section 74 leads to hose section 76 that is adjacent to and along the upper cover 58. Hose section 76 connects in with plumbing section 78, which conveys water to the hose reel arrangement 30 and ultimately the hose 42.

Hose section 76 is stationary relative to a remaining portion of the reel frame 44 and reel 34. As the reel frame 44 and reel 34 rotate about its axis 46, hose section 76, as also hose section 74 and conveyance hose 72 are stable and static.

It should be understood that the pump 70, conveyance hose 72, hose section 74, hose section 76, and plumbing section 78 are all covered and protected from the environment by the shroud 62. In some embodiments, heat is delivered to an interior of the shroud 62 and to these other portions of the plumbing including pump 70, conveyance hose 72, hose sections 74, 76, and plumbing section 78 in order to prevent any of these components from freezing. The shroud 62 is also usable to protect internal components in the shroud 62 from vandals.

Also visible in FIGS. 10-15 is the electrical wiring. An electrical control box 80 is electrically connected to allow for control of the manipulation and operation of the reel 34. The control box 80 also controls rotation of the reel frame 44 about axis 46, as well as rotation of the reel 34 about its winding axis 40. The control box 80 is also located within the interior of the shroud 62 to protect it from an external environment. Access to the control box 80 is gained by moving the doors 64.

Figure 16:
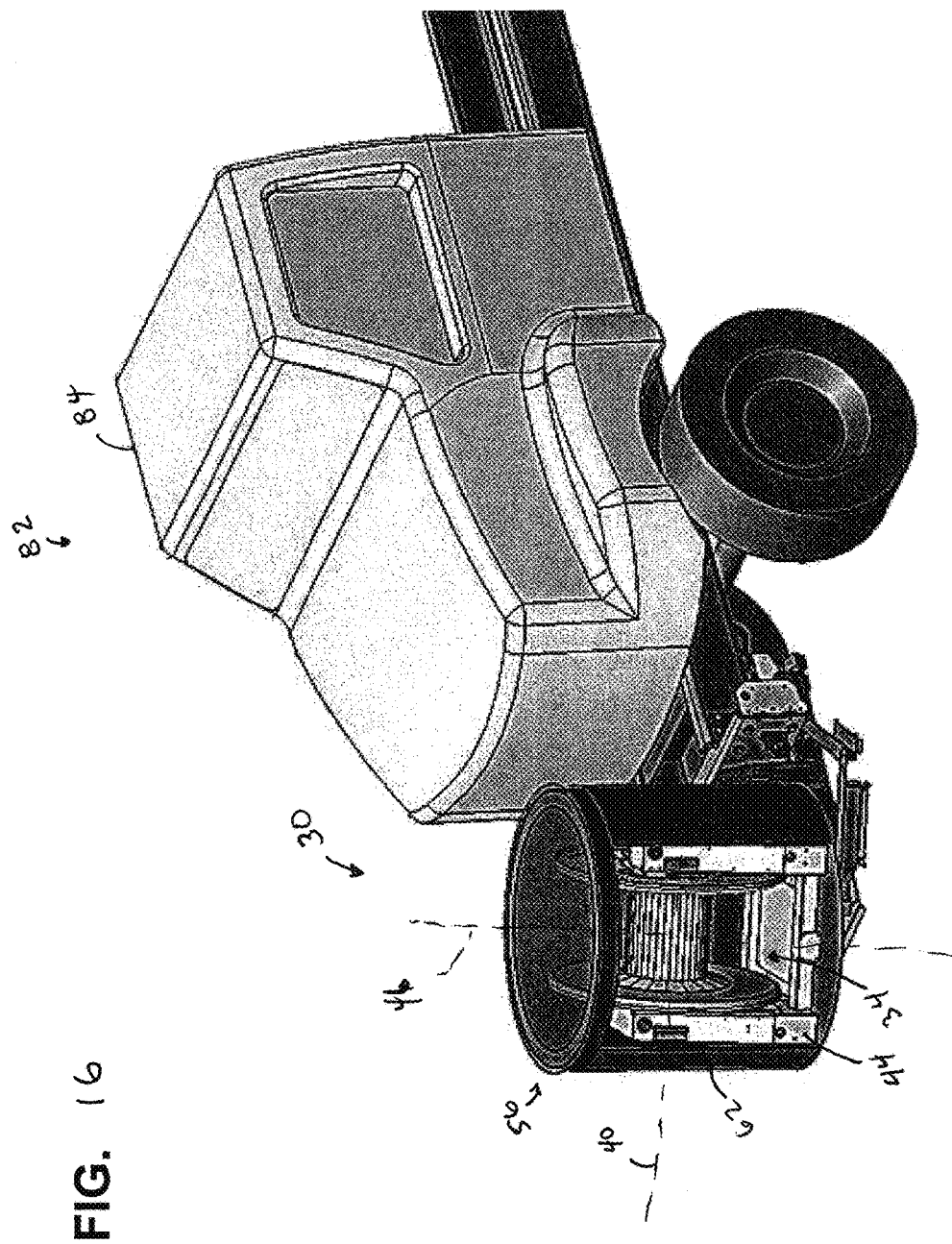
FIG. 16 is a schematic, perspective view of another embodiment of a hose reel arrangement in which the hose reel arrangement is mounted in front of the cab of a vehicle.

The mobile sewer cleaning unit 32 can be part of a truck, or it can be on a trailer towed behind a truck. In the embodiment of FIGS. 1-15, the hose reel arrangement 30 is mounted at a rear portion of the truck, as part of a trailer or the truck, behind the cab where the driver is located. In other embodiments, the hose reel arrangement 30 can be located elsewhere. For example, in FIG. 16, the hose reel arrangement 30 is mounted at the front of the truck 82 in front of the cab 84. The hose reel arrangement 30 of FIG. 16 includes many of the same features as described with respect to FIGS. 1-15 in that it has a reel frame 44 and reel 34 that rotate about axis 46 generally perpendicular to the horizontal ground surface. The reel 34 rotates about winding axis 40 that is perpendicular to the frame axis 46. The reel 34 and reel frame 44 are protected by cover arrangement 56, which includes shroud 62. The shroud 62 is illustrated in FIG. 16 as being cylindrical in shape.

In still other embodiments, the hose reel arrangement 30 can be mounted along a side of the truck 82 behind the cab 84 and forward of a rear end of the truck.

The many preferred arrangements, there is a bumper 100. The bumper 100 can be used with the hose reel arrangements 30 described herein, or it may be used independent with any type of vehicle. In FIG. 1, the bumper 100 is attached to the chassis 52 and is adjacent to the reel frame 44. In this manner, the bumper 100 protects the cover arrangement 56 and hose reel arrangement 30. The bumper 100 extends longitudinally in a direction away from the hose reel arrangement 30 so that the bumper 100 will absorb any impact with anything instead of causing damage to the shroud 62 and hose reel arrangement 30.

The bumper 100 as shown in FIGS. 1-3 is in an operating position, in which it is positioned to absorb impact and protect the hose reel arrangement 30. In FIGS. 4-9, the bumper 100 is in a collapsed position. The collapsed position puts the bumper 100 nearer the chassis 52 than when in the working position extended from the chassis 52.

In the collapsed position, the bumper 100 allows the hose 42 to extend or project from the interior of the shroud 62 and into the manhole without interference by the bumper 100. That is, because the bumper 100 is collapsed against the chassis 52, it does not interfere with movement of the hose 42.

The bumper 100 is selectively movable from the working position locked in extension from the chassis 52 to the collapsed position near the chassis 52. In preferred arrangements, the collapsed position can include at least 2 collapsed positions. The first collapsed position includes the bumper 100 extending to one end, while in a second collapsed position the bumper 100 will extend in a direction toward the opposite end. Compare FIG. 5 to FIG. 8, for example. FIG. 5 shows a first collapsed position in which the bumper 100 is collapsed in a direction toward the right side of the chassis 52. FIG. 8 shows a second collapsed position in which the bumper 100 is collapsed in a direction toward the left side of the chassis 52. The advantage to having two collapsed positions is that the bumper 100 can be moved in a direction away from obstructing or interfering with the hose 42 as it unwinds from the reel 34. In FIG. 5, for example, the bumper 100 is collapsed in a direction away from the opening 65 by the door 64. In FIG. 8, the collapsed position puts the bumper 100 also in a direction away from the opening 67 by the door 64.

Figure 17:
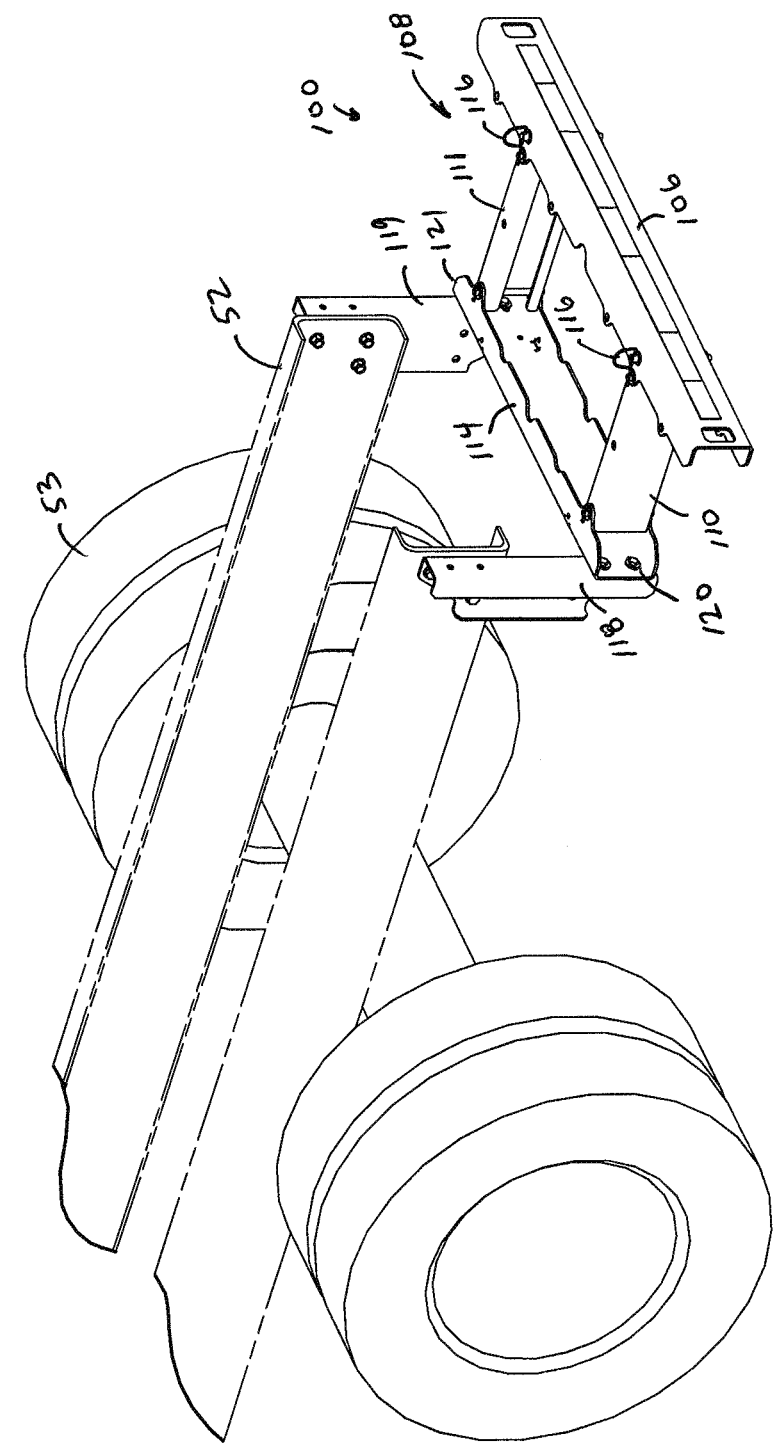
FIG. 17 is a perspective view of an embodiment of a bumper usable with a truck, such as the truck of FIGS. 1-15.
Figure 18:
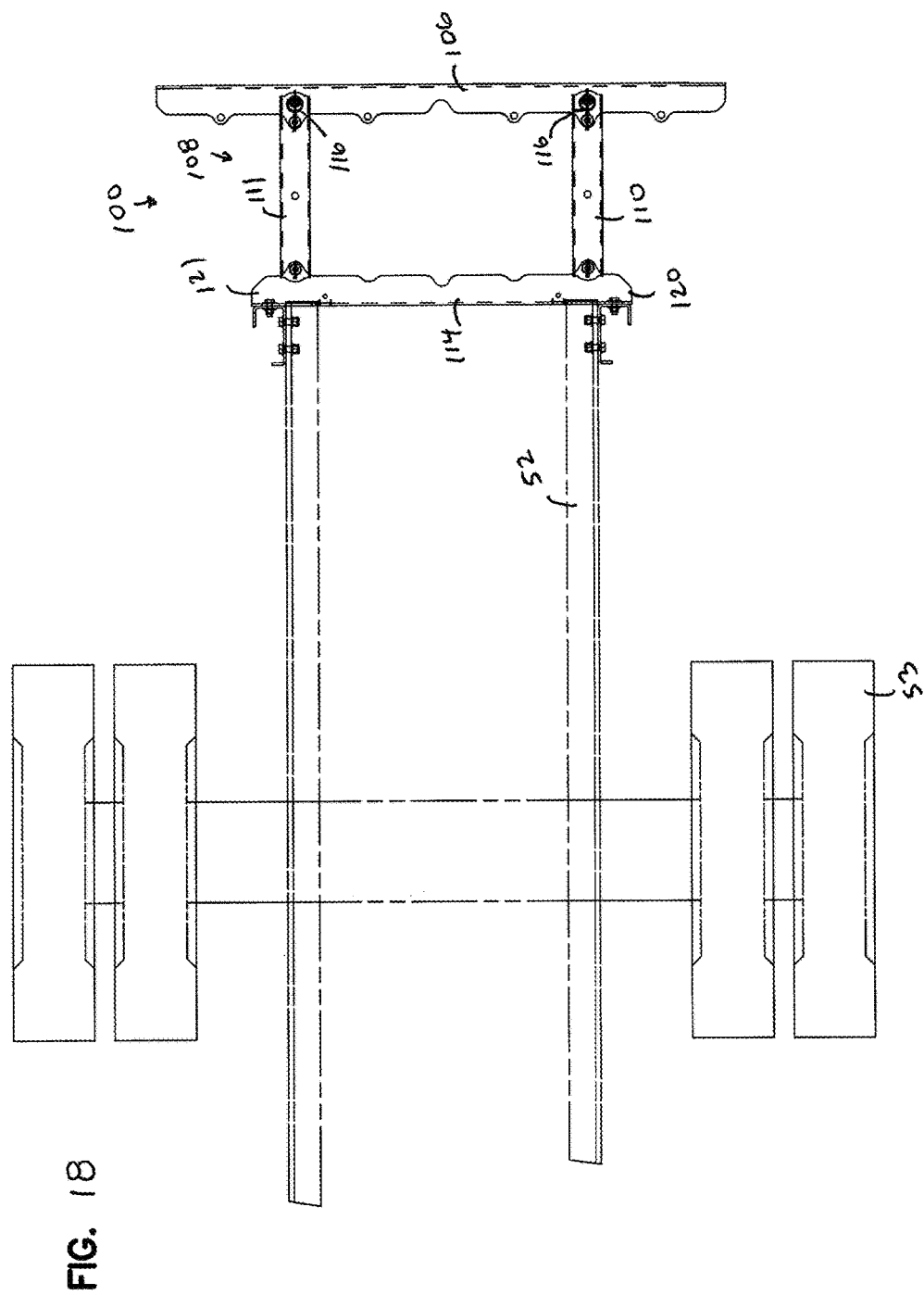
FIG. 18 is a top view of the bumper of FIG. 17.
Figure 19:
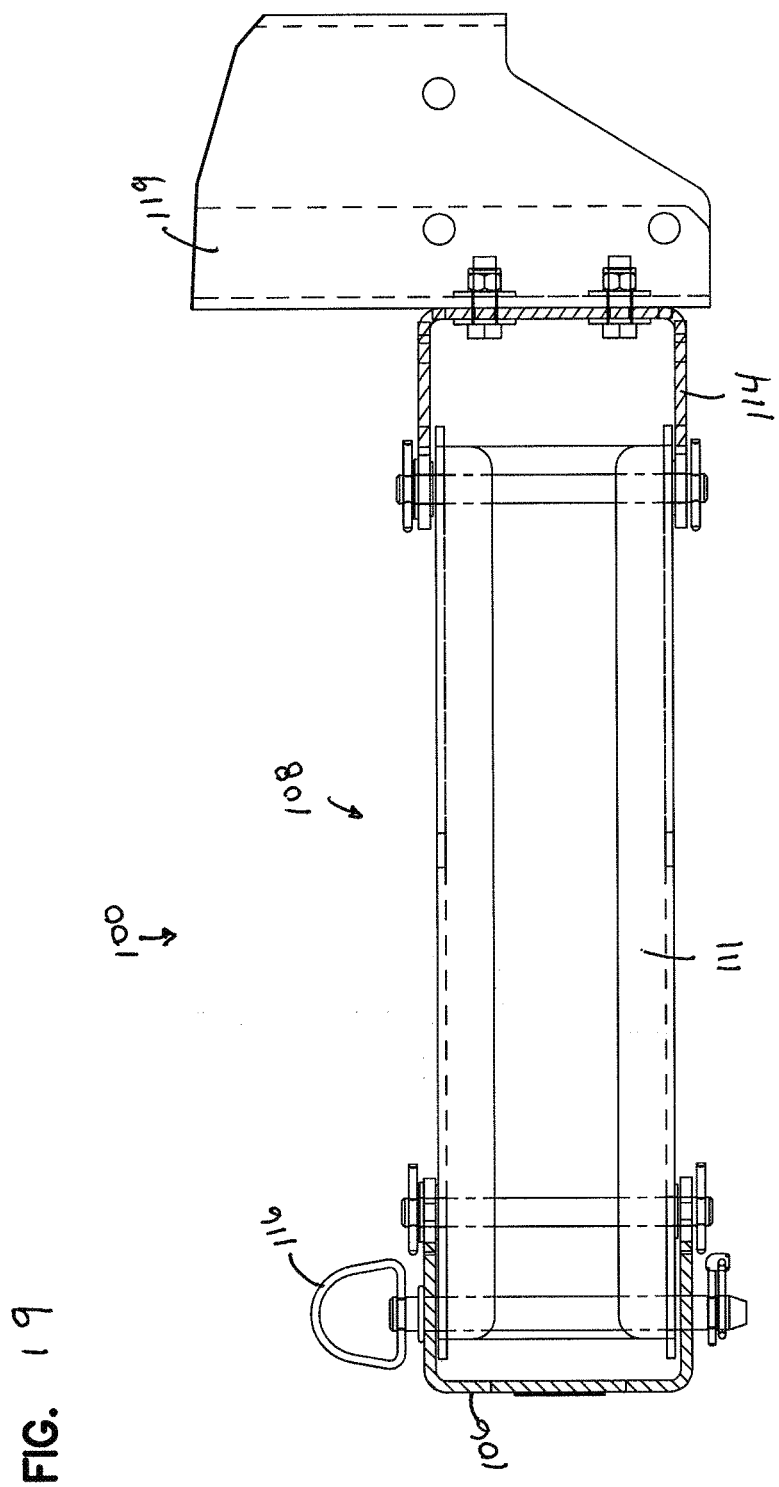
FIG. 19 is a side view of the bumper of FIG. 18.

Attention is directed to FIGS. 17-19, illustrating one example embodiment of bumper 100. The bumper 100, in this embodiment, includes a bumper bracket 106. The bumper bracket 106 is for absorbing impact and protecting the hose reel arrangement 30. The bumper bracket 106 extends generally horizontal and parallel to the ground surface.

The bumper 100 may further include a mounting arrangement 108. The mounting arrangement 108 secures the bumper bracket 106 to the truck chassis 52. The mounting arrangement 108 is constructed and arranged to allow the bumper bracket 106 to be selectively movable from the working position locked in extension from the chassis 52 to a collapsed position nearer the chassis 52 than when in the working position.

Many different embodiments are possible. One example embodiment of the mounting arrangement 108 includes a pair of extension mounting brackets 110, 111 connected to the bumper bracket 106. The mounting brackets 110, 111 are illustrated as being generally perpendicular to the bumper bracket 106.

Mounting arrangement 108 may include a horizontal mounting bracket 114. In the embodiment shown, the horizontal mounting bracket 114 may be mounted to be generally parallel to the bumper bracket 106. The pair of extension mounting brackets 110, 111 are secured to and are between the horizontal mounting bracket 114 and the bumper bracket 106. As can be seen from the drawings, the extension mounting brackets 110, 111 are illustrated as being at or adjacent the ends of the horizontal mounting bracket 114.

The bumper 100 includes a pin arrangement 116. The pin arrangement 116 is between the extension mounting brackets 110, 111 and the bumper bracket 106. The pin arrangement 116 is selectively movable such that when pin arrangement 116 is operably mounted in the extension mounting brackets 110, 111 and bumper bracket 106, the bumper bracket 106 is fixed relative to the extension mounting brackets 110, 111 and the horizontal mounting bracket 114 in the working position extending from the chassis 52. When the pin arrangement 116 is removed from the extension mounting brackets 110, 111 and bumper bracket 106, the bumper bracket 106 is movable relative to the extension mounting brackets 110, 111 and the horizontal mounting bracket 114 in the collapsed position adjacent to the chassis 52. Removal of the pins 116 allows the bumper bracket 106 to be pivoted along with the extension mounting brackets 110, 111 in a position against the horizontal mounting bracket 114. The bumper bracket 106 will be moved or pivoted either in a direction toward a first end 120 of the horizontal mounting bracket 114 or toward the opposite second end 121 of the horizontal mounting bracket 114.

The mounting arrangement 108 may include a pair of side mounting brackets 118, 119. The side mounting brackets 118, 119 are connected to and extend between the chassis 52 and the horizontal mounting bracket 114.

In operation, the mobile sewer cleaning unit 32 will be driven to wherever the access point is, typically a manhole. The truck 82 will be parked somewhere adjacent to the manhole, but it will not be critical to manipulate the truck 82 in any particular fashion relative to the manhole. The shroud 62 will then be opened by moving the door 64 in order to access and expose the hose reel arrangement 30. The door 64 is moved, in one embodiment, by sliding the door 64 along a track to provide the access opening. The reel frame 44 and reel 34 will be rotated along the frame axis 46 to provide the most convenient location of the reel 34 relative to the manhole opening.

In embodiments that use the collapsible bumper 100, the pins of the pin arrangement 116 will be pulled from the mounting arrangement 108. This will allow the bumper bracket 106 to be pivoted along with the extension mounting brackets 110, 111 in a position against the horizontal mounting bracket 114. The bumper bracket 106 will be moved or pivoted either in a direction toward first end 120 of the horizontal mounting bracket 114 or toward the opposite second end 121 of the horizontal mounting bracket 114. This will move the bumper bracket 106 out of the way and prevent the bumper bracket 106 from interfering with the hose 42.

The hose 42 will then be unwound or uncoiled from the reel 34 as the reel 34 turns about the reel winding axis 40. Water is pumped from the tank 68 through the hoses 72, 74, 76, 78 and into the hose 42. The water is then used to jet or clean the sewer.

Upon completion of cleaning, the reel 34 is wound an opposite direction about the reel winding axis 40 to coil the hose 42 back onto the reel 34. Once the hose 42 is within an interior of the shroud 62, the access opening (e.g., 65, 67) in the shroud 62 can be closed by moving the door 64 back into a position covering the opening.

When the cleaning operation is finished, the bumper 100 can be returned to its operating position by moving the bumper bracket 106 to an extended position such that the extension mounting brackets 110, 111 are perpendicular to the horizontal mounting bracket 114 and the bumper bracket 106. The pins of the pin arrangement 116 are then reinserted in the bumper bracket 106 and extension mounting brackets 110, 111 to lock the bumper bracket 106 and extension mounting brackets 110, 111 in the operating position.

The above represents principles of this disclosure. Many embodiments can be made using these principles.

What is claimed is:

1. A hose reel arrangement for sewer jetting, the hose reel arrangement comprising:
   (a) a reel having a reel winding axis;
   (b) a hose wound around the reel;
   (c) a reel frame holding the reel; the reel frame with the reel being rotatable about a frame axis perpendicular relative to the reel winding axis; and
   (d) a cover arrangement over a majority of the reel and reel frame; the cover arrangement being selectively moveable to expose a portion of the reel to provide access to the hose; the cover arrangement being fixed in position relative to the rotatable reel frame and reel; the cover arrangement including an upper cover covering a top of the reel and frame, a bottom cover covering a bottom of the reel and frame, and a shroud extending between the upper cover and bottom cover.

2. The hose reel arrangement of claim 1 wherein:
   (a) the shroud includes a movable door to expose the portion of the reel.

3. The hose reel arrangement of claim 1 wherein:
   (a) the cover arrangement covers at least 90% of the reel and reel frame.

4. The hose reel arrangement of claim 1 wherein:
   (a) the cover arrangement covers 100% of the reel and reel frame.

5. The hose reel arrangement of claim 1 wherein:
   (a) the reel frame and reel are rotatable at least 120°.

6. The hose reel arrangement of claim 1 wherein:
   (a) the reel frame and reel are rotatable at least 180°.

7. The hose reel arrangement of claim 1 further comprising:
   (a) a chassis; and
   (b) a bearing secured to the chassis; the reel frame being mounted on the bearing so as to be rotatable relative to the chassis.

8. The hose reel arrangement of claim 7 further comprising:
   (a) a bumper attached to the chassis and adjacent to the reel frame.

9. The hose reel arrangement of claim 8 wherein:
   (a) the bumper is selectively moveable from an extended operating position to a collapsed position.

10. The hose reel arrangement of claim 1 wherein:
    (a) the shroud is substantially cylindrical in cross-section.

11. The hose reel arrangement of claim 1 wherein:
    (a) the shroud is obround in cross-section.

12. The hose reel arrangement of claim 1 wherein:
    (a) the shroud is polygonal in cross-section.

13. The hose reel arrangement of claim 1 wherein:
    (a) the shroud has one or more faceted sides.

14. A truck including a hose reel arrangement of claim 1 further comprising:
    (a) a cab; and
    wherein the hose reel arrangement is mounted at a rear of the truck behind the cab.

15. A truck including a hose reel arrangement of claim 1 further comprising:
    (a) a cab; and
    wherein the hose reel arrangement is mounted at a front of the truck in front of the cab.

16. A truck including a hose reel arrangement of claim 1 further comprising:
    (a) a cab; and
    wherein the hose reel arrangement is mounted along a side of the truck, behind the cab and forward of a rear end of the truck.

17. A hose reel arrangement for sewer jetting, the hose reel arrangement comprising:
    (a) a reel;
    (b) a hose wound around the reel;
    (c) a reel frame holding the reel; the reel frame with the reel being rotatable about a frame axis perpendicular relative to a horizontal mounting surface; and
    (d) a cover arrangement over a majority of the reel and reel frame; the cover arrangement being selectively moveable to expose a portion of the reel to provide access to the hose; the cover arrangement being fixed in position relative to the rotatable reel frame and reel;
    wherein the cover arrangement includes an upper cover covering a top of the reel and frame, a bottom cover covering a bottom of the reel and frame, and a shroud extending between the upper cover and bottom cover.

18. The hose reel arrangement of claim 17 wherein:
    (a) the shroud includes a movable door to expose the portion of the reel.

19. The hose reel arrangement of claim 17 wherein:
    (a) the shroud is substantially cylindrical in cross-section.

20. The hose reel arrangement of claim 17 wherein:
    (a) the shroud is obround in cross-section.

21. The hose reel arrangement of claim 17 wherein:
    (a) the shroud is polygonal in cross-section.

22. The hose reel arrangement of claim 17 wherein:
    (a) the shroud has one or more faceted sides.

* * * * *